No. 860,130. PATENTED JULY 16, 1907.
D. FORSBERG.
PIPE CUTTER.
APPLICATION FILED MAY 22, 1907.
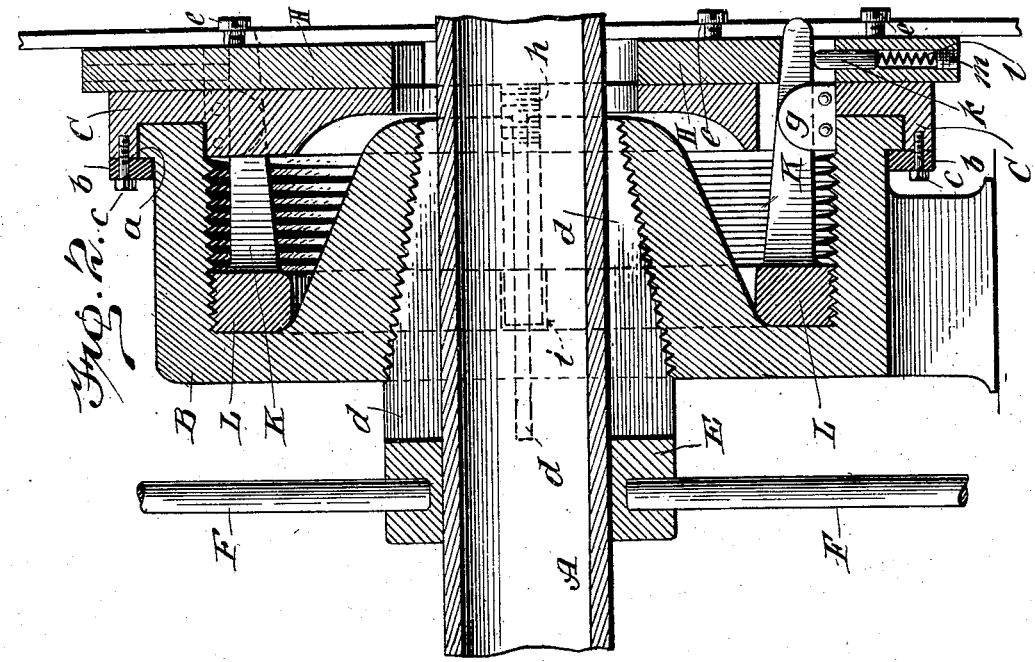
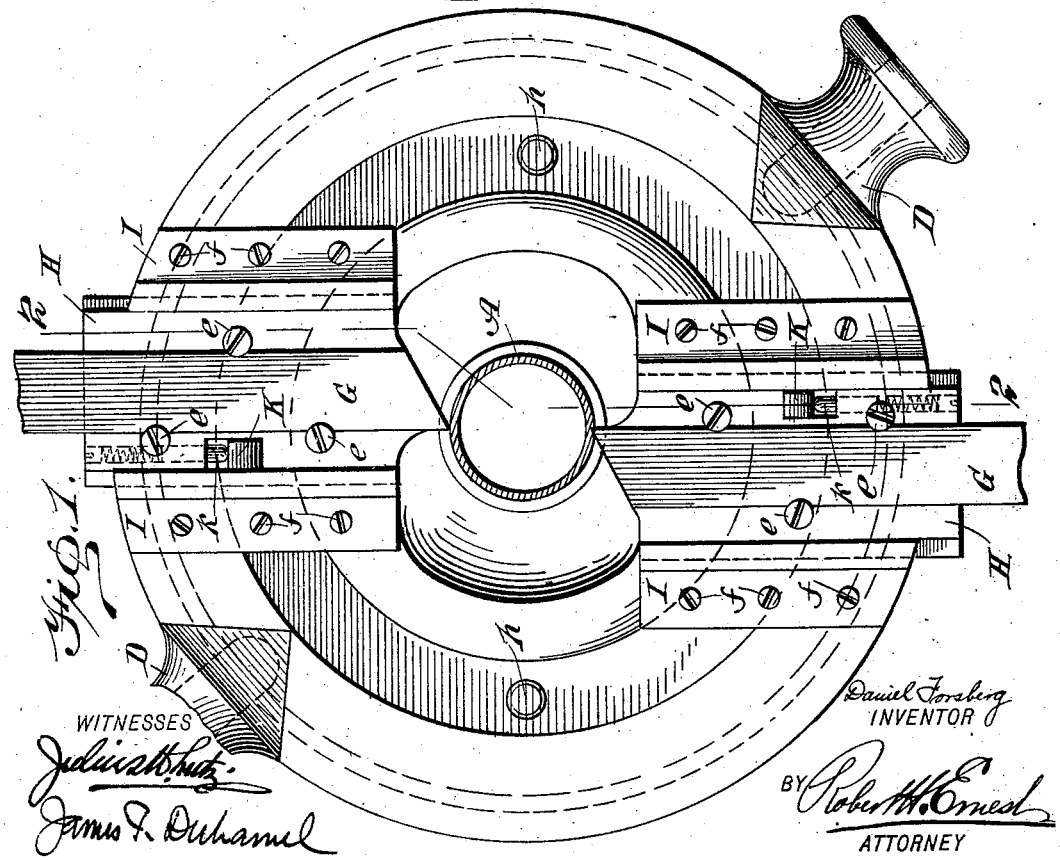

UNITED STATES PATENT OFFICE.

DANIEL FORSBERG, OF NEW YORK, N. Y.

PIPE-CUTTER.

No. 860,130.         Specification of Letters Patent.         Patented July 16, 1907.

Application filed May 22, 1907. Serial No. 375,113.

*To all whom it may concern:*

Be it known that I, DANIEL FORSBERG, a citizen of the United States, residing at the borough of Brooklyn, city of New York, in the county of Kings and State of New York, have invented certain new and useful Improvements in Pipe-Cutters, of which the following, in connection with the accompanying drawings, is a full, clear, and exact specification, sufficient to enable others skilled in the art to make and use my invention.

The object of this invention is to provide or produce an implement for cutting pipes, which implement is of few and simple parts, easy to construct and assemble for use, which is comparatively light yet amply strong and durable, which will firmly clamp the pipe or article to be cut, and which will effect the cutting in a simple, expeditious and reliable manner.

To accomplish all of the foregoing objects and to secure other and further advantages in the matters of construction, application, operation and use, my improvements involve certain relative arrangements or combinations of parts, principles of operation and peculiarities of construction, as will be herein first fully described and then pointed out in the claims.

In the accompanying drawings which form part of this specification, I have shown a pipe cutter constructed and arranged for operation in accordance with my invention and involving my improvements.

In these drawings, Figure 1 is a front or face view and Fig. 2 a longitudinal section, partly in elevation, upon planes through the broken line 2—2 of Fig. 1.

In both these figures, like reference characters, wherever they appear, are employed to indicate corresponding parts.

A represents a pipe or tube which is to be cut. While the improved implement is chiefly intended for the cutting of pipes, obviously it might be employed to cut solid rods if so desired.

B is the main body of the implement within which the object to be cut is to be securely clamped, or, in other words, the main body of the implement and the object to be cut are intended to be held immovable with respect to each other while the cutting is being accomplished. Obviously the object to be cut may be held in a vise as is customary, and the implement adjusted thereon, or, the implement may be sustained in a vise or other suitable support and the object adjusted in the implement.

C is the circular movable head of the implement, which head carries the cutting blades and rotates upon the face of the body B. The body B is preferably provided with a ring, or ledge or projection, $a$, which enters and rides in a recess in the circular head, C; and the head and body are maintained in proper working relation by an annular ring, $b$, which fits against the ledge, $a$, and which is bolted or otherwise secured to the head C by suitable securing bolts, as $c$. On the head C are applied socket pieces, as D, intended to receive the levers by which the head of the implement may be powerfully rotated to produce the cutting effect and to withdraw the cutters when rotated in the opposite direction.

The central opening in the body B is threaded upon the interior and receives the means by which the pipe or other article and the body are rigidly clamped one with respect to the other.

In the simplest form which I have been able to devise, the clamping is effected by a bushing, represented at E, the same being hollow to permit the article to pass through it and being threaded to correspond with the interior threading of the body, the two threaded surfaces being inclined with respect to the axis of the implement, as indicated. The bushing is split or slitted for a portion of its length, preferably at several points, as at $d$, $d$; and it is supplied with removable levers as F, F, by which it may be powerfully turned to its seat when required. When the article to be cut is inserted in the bushing and the latter turned into the body with sufficient force, the fingers of the bushing are powerfully compressed upon the article and thus secure and hold the latter. When it is desired to advance the article in the implement or to withdraw the article, the bushing is simply unturned to a sufficient degree and the article being then free to be moved, is drawn out of place.

The split bushing enables me to employ but one clamping device for several different sizes of articles to be cut, as will be apparent. By supplying different sizes of bushings, the implement is adapted for the cutting of articles of all diameters up to the size of the central opening through the body of the implement.

G, G, represent the cutter blades, the same being of suitable material, sufficiently hard, and fashioned with an edge proper for cutting the pipe or other article, These blades are mounted in slides, H, and are secured therein by screws, as at $e$, which serve to hold the blades to their work but which will allow them to be adjusted to proper cutting position, either by loosening the said screws and afterwards tightening them, or by resorting to taps of the hammer on the outer ends of the blades by which the said blades are driven to the cutting position against the holding action of the screws $e$.

The slides H, H are secured to the rotatable head C by over-reaching guide plates on each side, as at I, I, the guide plates being held in place by screws, as at $f, f$. The slides move with necessary freedom upon the face of the rotatable head and under the overhanging portions of the guide plates, and yet they are held practically unyielding except in the direction in which they slide, that is towards and from the axis of the implement.

The slides and therefore the cutting blades which they carry are made automatically adjustable towards and from the axis of the implement as the head is rotated in one direction or the other,—in one direction to force the blades towards the axis as the cutting progresses and the other to withdraw them to enable the article to be readjusted for another cutting. To accomplish the automatic feeding I employ wedge shape projections or arms, as K, K mounted upon or made part of a ring, L, threaded upon its exterior and running in the correspondingly threaded portion of the interior of the body. These wedge shaped arms project through openings provided for the purpose in the rotatable head and other slots cut in the slides H, the arms being held with respect to the head by removable keepers, as $g$, and by steady-bolts, represented at $h, h$, seated in the head C by which they are firmly held and sliding in perforations, as $i$, provided for the purposes in the ring L. As the head C is rotated the ring L is also rotated and is therefore caused, by its threaded connection with the interior of the body B, to advance or recede in the direction of the axis of the implement.

Under the form shown the cutting edges of the blades are so fashioned that the head C should be rotated to the left in Fig. 1 to accomplish the cutting. Under this circumstance the thread upon the interior of the body runs to the right, that is, it causes the ring L as it is rotated to advance from the position shown in Fig. 2 towards the head C, and this causes the slides and therefore the cutting blades to be forced towards the axis of the implement. If the cutting blades were fashioned to cut by turning the head in the opposite direction, then the threading on the interior of the body and the exterior of the ring L would be inclined in the other direction, that is towards the left instead of towards the right.

Under the construction and arrangement so far shown and described, it will be apparent that the cutting blades are compelled to advance to their work precisely as the head is rotated, and this is a slow and powerful advance owing to the length of the wedge and its small inclination.

When the cutting has been accomplished and the head rotated in the opposite direction, the slides and the cutters are compelled to recede by employment of spring actuated bearings which contact with the outer faces of the wedge shaped arms K. The bearing pieces, represented at $k$, are movable in slots provided for them in the slides H and are operated upon by sufficiently powerful springs, represented at $l$, and held in place by suitable plugs, as $m$. When the slides are advancing towards the center from the position shown in Fig. 2, the bearing pieces $k$ are forced into the openings provided for them and against the action of the springs $l$, compressing the latter. When the rotatable head is reversed, the springs $l$ force the bearing pieces against the wedge shaped arms and therefore force the slides H to move back or away from the work, in a manner which will be readily understood.

The improved implement, constructed and arranged substantially as above set forth, affords a powerful and certain means of cutting pipes and rods, it makes a smooth, clean cut, is easily operated, quickly adjusted, and answers all the purposes of the invention hereinbefore alluded to.

Having now fully described my invevntion, what I claim as new and desire to secure by Letters Patent, is:

1. In a pipe cutter, the combination with the body and a rotatable head mounted thereon and carrying adjustable cutter blades, of a split bushing exteriorly inclined and threaded and arranged to clamp the article to be cut with respect to the body, substantially as set forth.

2. In a pipe cutter, the combination with the body and means for clamping an article therein, of a rotatable head mounted on the body and slotted slides mounted on the head, the said body having an exterior annular ledge and the rotatable head being recessed, a keeper ring removably secured upon the head and arranged to hold the parts in working position, wedge shaped arms projecting through the slides, and means for moving said arms, for the purposes set forth.

3. In a pipe cutter, the combination with the body and means for clamping an article to be cut, of a rotatable head mounted upon said body, slotted slides mounted upon the head, adjustable cutter blades mounted in the slides, wedge shaped arms projecting through the slides, and means for moving said arms, substantially as and for the purposes set forth.

4. In a pipe cutter, the combination of the body, a rotatable head mounted thereon, slotted slides carrying cutter blades, and wedge shaped arms projecting through the slides for automatically moving the latter as the head is rotated.

5. In a pipe cutter, the combination of the body, a rotatable head mounted thereon, slides carrying cutter blades, a threaded ring movable in the body, and wedge shaped arms on said ring entering slots in the slides, substantially as and for the purposes explained.

6. In a pipe cutter, the combination with the body, of a rotatable head mounted thereon, a threaded ring movable in the body and having wedge shaped arms, slides slotted to receive said arms, and spring actuated blocks mounted in the slides and bearing on the arms, for the object set forth.

7. In a pipe cutter, the combination of the body, the rotatable head, the threaded ring having the wedge shaped arms, and the steady-bolts applied in the head and entering recesses in the ring, as set forth.

8. In a pipe cutter, the combination with the body and rotatable head mounted thereon, of the slotted slides applied on the head, adjustable cutter blades applied on the slides, wedge shaped arms for automatically advancing the slides, spring actuated blocks for automatically retracting the slides, and means for clamping the article to be cut.

DANIEL FORSBERG.

Witnesses:
DAVID ROBINSON,
J. M. HOWARD.